Dec. 18, 1945.    M. W. SEYMOUR    2,391,198
SENSITIVE INTERLAYERS IN MULTILAYER FILM
Filed May 27, 1943
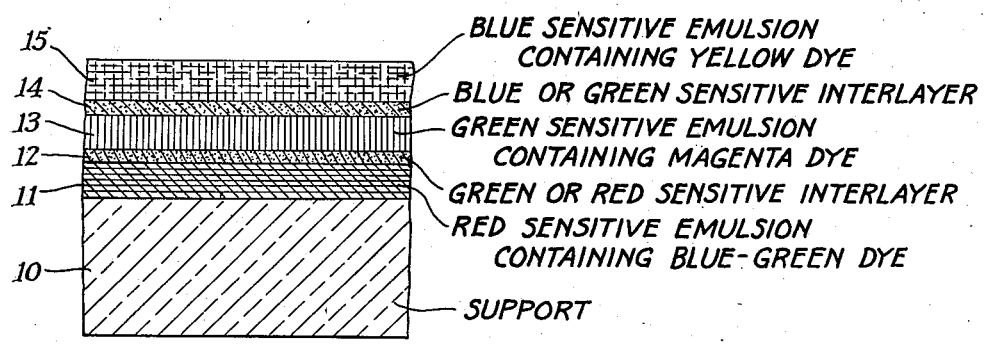
MERRILL W. SEYMOUR
INVENTOR
BY
ATTORNEYS Patented Dec. 18, 1945

2,391,198

UNITED STATES PATENT OFFICE 2,391,198

SENSITIVE INTERLAYERS IN MULTI-LAYER FILM

Merrill W. Seymour, Rochester, N. Y., assignor to Eastman Kodak Company, Rochester, N. Y., a corporation of New Jersey Application May 27, 1943, Serial No. 488,697
In Great Britain December 9, 1942

3 Claims. (Cl. 95—2)

This invention relates to color photography and particularly to sensitive material for use in those processes of color photography employing the dye destruction or silver bleach-out process.

It is well known that in the dye destruction process, a dyestuff, dye-forming substance or dye derivative has to be reacted upon by or with the chemical or catalytic aid of a silver image or a silver salt image. Thus, in the silver dyestuff bleach-out process, a dyestuff is bleached with the aid of a silver image, generally the first developed silver image, by means of, for example, an acid thiourea bath. In these dye destruction processes, the dyestuff, dye-forming substance or dye derivative is generally present in the sensitive material before exposure and accordingly is diffusely present in the emulsion or emulsions. Where a dyestuff is formed from a dye-forming substance after exposure, this is generally formed diffusely and subjected to imagewise destruction.

One of the advantages of dye destruction processes is that the sensitive material having a plurality of differentially color-sensitized emulsions in different layers on a single support, each emulsion layer containing an appropriate dyestuff, dye-forming substance or dye derivative, may be subjected after exposure to simultaneous processing of all the layers. Generally with colored layers there is used a single bath, e. g., of acid thiourea or alkaline stannous chloride which will destroy the dyestuffs in the neighborhood of all the silver images in one operation. However, difficulties sometimes arise through the diffusion of the dyestuffs, dye-forming substances or dye derivatives from the layers in which they were originally present into adjacent layers. This may result in falsification of the color rendering and in highlight stain. It is known to provide intermediate layers, e. g., of gelatin, but if the dyestuffs, dye-forming substances or dye derivatives diffuse (wander) into the intermediate layers, they may be acted upon inadequately, if at all, by the image-forming baths.

It has, therefore, been proposed to incorporate into such intermediate layers substances such as colloidal silver or exposed silver halide which destroy directly or in combination with the treating baths any dyestuffs, dye-forming substances or dye derivatives which may diffuse into such intermediate layer from adjacent layers.

It is an object of the present invention to provide a multi-layer material in which the tendency to highlight stain due to dye diffusion is overcome. A further object is to provide a method for eliminating highlight stain in a multi-color bleach-out process.

These objects are accomplished, according to my invention by providing an intermediate layer in a multi-layer material containing dye materials, e. g., dyes, dye-forming substances, or dye derivatives, the intermediate layer containing a silver salt emulsion sensitive to light of the same spectral region to which one of the adjacent emulsion layers is effectively sensitive. The intermediate layer may also contain a dye, such as a filter dye, which is uniformly removable in the developer, provided it contains no dye bleachable under the influence of a silver or silver salt image.

In the accompanying drawing, the single figure is a sectional view of a film constructed according to my invention.

I have found that it is not necessary to destroy diffusely the dyestuffs, dye-forming substances or dye derivatives which have diffused into an intermediate layer from an adjacent image layer. A very useful result can be secured if they are destroyed in the intermediate layer in the same image-wise manner as they are destroyed in the image layer from which they have wandered. This, I have further found, can be accomplished by including in the intermediate layer a proportion of silver salt emulsion sensitive to light in the same region of the spectrum as is the silver salt emulsion in the adjacent layer from which dyestuff, dye-forming substance or dye intermediate may diffuse. On exposure of the sensitive material an image will be formed in the intermediate layer which is similar to the image in the said adjacent layer and both layers will, therefore, be acted upon similarly as regards image formation or destruction by the processing baths.

In general, it will be necessary that the silver salt emulsion in the intermediate layer be sensitive to light in the same region of the spectrum as is the silver salt emulsion in that adjacent layer from which diffusion is most to be feared. It is quite useful and practicable, however, for it to be sensitive to light to which both adjacent emulsions are effectively sensitive.

Generally the intermediate layer will be uncolored but it may contain a filter dyestuff provided that this is one which can be diffusely decolorized or removed so that it will not undergo image-wise destruction. Of course, the effective sensitivity of any emulsion will be modified to some extent by the color of any of the layers lying over it.

Preferably, the material of the present invention has three silver halide emulsion layers sensitive, respectively, to blue, green and red light with two intermediate layers between the respective adjacent emulsion layers. For example, the intermediate layer between the red-sensitive and green-sensitive emulsion layers may be sensitized to red light or to green light or to both red and green light, or the intermediate layer between the blue-sensitive and green-sensitive layers (where these are adjacent) may be sensitive to green light or only to blue light or may be sensitized to green light.

By way of example, as shown in the drawing, a sensitive material for use in the silver dyestuff bleach-out process has coated on a support 10 in succession a red-sensitized silver halide emulsion layer 11 containing blue-green dye, a first uncolored interlayer 12, a green-sensitized silver halide emulsion layer 13 containing magenta dye, a second uncolored interlayer 14 and a blue sensitive silver halide emulsion layer 15 containing yellow dye. If the blue-green dye is such that it tends to diffuse into the first interlayer 12, then this contains a small quantity of red-sensitized silver halide emulsion. If the blue-green and magenta dyes are such that both tend to diffuse into the first interlayer 12, then this contains a small quantity of silver halide emulsion sensitized for green and red light. If the yellow dye is such that it tends to diffuse into the second intermediate layer 14, then this contains a small quantity of blue-sensitive silver halide emulsion. If the yellow and magenta dyes are such that both tend to diffuse into the second interlayer 14, then this contains a small quantity of silver halide emulsion sensitive to green and blue light.

Image dyes suitable for use according to my invention are any of those disclosed in Ehrenfried U. S. Patent 2,322,001, granted June 15, 1943.

Upon exposure of the sensitive material to a multicolored object or with lights of the three primary colors, latent images are formed in the three emulsion layers and also in the interlayers. Since the interlayers are subjected to the same processing baths as the emulsion layers, the dyestuffs which creep into the interlayers are destroyed image-wise corresponding to the image-wise destruction of the dyestuffs in the emulsion layers.

Any one of the emulsions referred to above may be replaced by an infra-red sensitive emulsion, and in case the image-forming dye in this layer wanders into an adjacent intermediate layer, this layer should contain a small amount of infra-red-sensitive emulsion.

It will be understood that the examples included herein are illustrative only, and that my invention is to be taken as limited only by the scope of the appended claims.

I claim:

1. A multi-layer element for the silver-bleach-out process of color photography, comprising a support having thereon a plurality of silver halide emulsion layers sensitive to different colors, at least one of said layers containing a uniform deposit of an image-forming dye prior to exposure, and between the latter emulsion layer and another of said emulsion layers a water-permeable colloid layer containing unexposed silver halide sensitive to the color to which the adjacent layer containing said dye is effectively sensitive, said colloid layer being free of image-forming dye.

2. A multi-layer element for the silver-bleach-out process of color photography, comprising a support having thereon three silver halide emulsion layers each sensitive to one of the primary colors, at least one of said layers containing a uniform deposit of an image-forming dye prior to exposure, and between the latter emulsion layer and another of said emulsion layers a water-permeable colloid layer containing unexposed silver halide sensitive to the color to which the adjacent layer containing said dye is effectively sensitive, said colloid layer being free of image-forming dye.

3. A multi-layer element for the silver-bleach-out process of color photography, comprising a support having thereon three gelatin-silver halide emulsion layers each sensitive to one of the primary colors, said layers containing a uniform deposit of a bleachable image-forming dye prior to exposure, and between any two of said emulsion layers a gelatin layer containing unexposed silver halide sensitive to the color to which an adjacent emulsion layer is effectively sensitive, said gelatin layer being free of image-forming dye.

MERRILL W. SEYMOUR.